United States Patent
Gu

(10) Patent No.: US 7,327,775 B1
(45) Date of Patent: Feb. 5, 2008

(54) CDMA RECEIVER

(75) Inventor: Qizheng Gu, San Diego, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/471,857

(22) Filed: Dec. 23, 1999

(51) Int. Cl.
*H04B 1/173* (2006.01)
*H04L 27/30* (2006.01)
*H04L 27/28* (2006.01)
*H04K 1/00* (2006.01)

(52) U.S. Cl. .................... 375/130; 375/140; 375/260

(58) Field of Classification Search ........... 342/357, 342/350; 375/130, 148, 140, 260, 323, 324; 370/208–342, 430, 503; 455/150.1, 179.1, 455/182.1, 313, 315, 317, 213, 260, 323, 455/324, 336–337, 105.1; 333/18; 371/130, 371/148
See application file for complete search history.

(56) References Cited

U.S. PATENT DOCUMENTS

| | | | | |
|---|---|---|---|---|
| 3,982,188 A * | 9/1976 | Matsuzawa et al. | ..... | 455/161.3 |
| 5,063,560 A * | 11/1991 | Yerbury et al. | ..... | 370/335 |
| 5,465,418 A * | 11/1995 | Zhou et al. | ..... | 455/332 |
| 5,499,266 A * | 3/1996 | Yokev et al. | ..... | 375/136 |
| 5,623,485 A * | 4/1997 | Bi | ..... | 370/209 |
| 5,754,542 A * | 5/1998 | Ault et al. | ..... | 370/342 |
| 5,771,229 A * | 6/1998 | Gavrilovich | ..... | 370/342 |
| 5,870,378 A * | 2/1999 | Huang et al. | ..... | 370/209 |
| 5,878,087 A * | 3/1999 | Ichihara | ..... | 375/316 |
| 5,963,845 A * | 10/1999 | Floury et al. | ..... | 455/12.1 |
| 5,999,824 A * | 12/1999 | Na | ..... | 455/553.1 |
| 6,009,124 A * | 12/1999 | Smith et al. | ..... | 375/267 |
| 6,088,348 A * | 7/2000 | Bell et al. | ..... | 370/343 |
| 6,088,399 A * | 7/2000 | Luz et al. | ..... | 375/260 |
| 6,091,759 A * | 7/2000 | Rotstein et al. | ..... | 375/140 |
| 6,115,363 A * | 9/2000 | Oberhammer et al. | ..... | 370/277 |
| 6,151,328 A * | 11/2000 | Kwon et al. | ..... | 370/441 |
| 6,154,166 A * | 11/2000 | Sawada et al. | ..... | 342/20 |
| 6,195,563 B1 * | 2/2001 | Samuels | ..... | 455/553 |
| 6,198,731 B1 * | 3/2001 | Hamada et al. | ..... | 370/335 |
| 6,208,875 B1 * | 3/2001 | Damgaard et al. | ..... | 455/552.1 |
| 6,236,848 B1 * | 5/2001 | Igarashi et al. | ..... | 455/341 |
| 6,289,221 B1 * | 9/2001 | Ritter | ..... | 455/447 |
| 6,292,474 B1 * | 9/2001 | Ali et al. | ..... | 370/328 |

(Continued)

FOREIGN PATENT DOCUMENTS

EP  0 678 974 A3  11/1996

(Continued)

*Primary Examiner*—Mohammed Ghayour
*Assistant Examiner*—Lawrence Williams
(74) *Attorney, Agent, or Firm*—Harrington & Smith, PC

(57) ABSTRACT

A signal reception method including method and apparatus for receiving a signal, down converting the received signal through multi-tone down conversion to form an intermediate signal, and decoding the intermediate signal to extract data. In an embodiment, the received signal may include multiple transmission bands of a multi-code (MC)-CDMA signal, each of which occupies a different spectrum. Each of the transmission bands also includes an information channel signal. When the received MC-CDMA signal is down converted through multi-tone down conversion, the intermediate signal is formed. The intermediate signal includes a common spectrum that includes an information channel from a plurality of transmission bands. When the intermediate signal is decoded, data from a plurality of information channel bands is extracted. The method and apparatus may be implemented in a multi-mode MC-CDMA/CDMA receiver.

40 Claims, 7 Drawing Sheets

U.S. PATENT DOCUMENTS

| | | | |
|---|---|---|---|
| 6,307,851 B1 * | 10/2001 | Jung et al. | 370/342 |
| 6,308,048 B1 * | 10/2001 | Gore et al. | 455/76 |
| 6,324,171 B1 * | 11/2001 | Lee et al. | 370/342 |
| 6,332,083 B1 * | 12/2001 | Shi et al. | 455/552.1 |
| 6,334,051 B1 * | 12/2001 | Tsurumi et al. | 455/324 |
| 6,343,094 B1 * | 1/2002 | Yamamoto | 375/152 |
| 6,343,220 B1 * | 1/2002 | Van Der Salm | 455/552.1 |
| 6,351,236 B1 * | 2/2002 | Hasler | 342/357.09 |
| 6,389,059 B1 * | 5/2002 | Smith et al. | 375/141 |
| 6,411,825 B1 * | 6/2002 | Csapo et al. | 455/561 |
| 6,427,068 B1 * | 7/2002 | Suominen | 455/302 |
| 6,442,155 B1 * | 8/2002 | Suk et al. | 370/342 |
| 6,480,528 B1 * | 11/2002 | Patel et al. | 375/148 |
| 6,563,859 B1 * | 5/2003 | Oishi et al. | 375/148 |
| 6,580,902 B1 * | 6/2003 | Sorrells et al. | 455/333 |
| 6,614,776 B1 * | 9/2003 | Proctor, Jr. | 370/342 |
| 6,631,170 B1 * | 10/2003 | Gu | 375/316 |
| 6,690,949 B1 * | 2/2004 | Shamlou et al. | 455/557 |
| 6,747,948 B1 * | 6/2004 | Sarraf et al. | 370/210 |
| 6,766,178 B1 * | 7/2004 | Damgaard et al. | 455/552.1 |
| 6,781,980 B1 * | 8/2004 | Dajer et al. | 370/342 |
| 6,785,556 B2 * | 8/2004 | Souissi | 455/557 |
| 6,801,788 B1 * | 10/2004 | Csapo et al. | 455/561 |
| 6,925,067 B2 * | 8/2005 | Jou | 370/329 |
| 2001/0043583 A1 * | 11/2001 | Sakoda et al. | 370/337 |
| 2002/0110189 A1 * | 8/2002 | Souissi et al. | 375/235 |
| 2003/0025623 A1 * | 2/2003 | Brueske et al. | 341/139 |

FOREIGN PATENT DOCUMENTS

| | | | |
|---|---|---|---|
| EP | 0 851 601 A2 * | 7/1998 | |
| EP | 0 678 974 B1 | 12/2005 | |

* cited by examiner

CDMA RECEIVER

FIELD OF THE INVENTION

The present invention relates generally to code division multiple access (CDMA) receivers, and more particularly, to a method and apparatus for receiving multi-carrier (MC) CDMA signals that allows efficient implementation of a CDMA receiver in CDMA systems having multiple modes of operation.

BACKGROUND OF THE INVENTION

FIG. 1 shows a cellular system 100. The cellular system 100 coverage area may be divided into separate areas defined by cells 101-107. Each mobile station 120-122 may operate within the coverage area of cellular system 100. Each cell 101-107 is controlled by a radio frequency transmitting and receiving base station 111-117 that allows base station-to-mobile and reverse-link (mobile station to base station) channels to be established. The reverse-link and forward-link channels provide paths for communication between mobile stations and an associated base station 111-117. Cellular system 100 may be implemented according to one of the many cellular system standards currently in use or proposed for use. For example, system 100 may be implemented in accordance with the Telecommunications Industry Association standard (TIA/EIA) IS-95 Mobile Station-Base Station Compatibility Standards for Dual-Mode Wideband Spread Spectrum Cellular System ("IS-95") or in accordance with the Japanese Association of Radio Industries and Businesses (ARIB) standard Specification of Mobile Station for 3G Mobile Station System Version 1.0 (WCDMA) or other third-generation (3G) standards, such as the European multi-carrier CDMA (MC-CDMA) or TIA/EIA cdma2000 First Generation Standard (cdma-2000__1x).

In cellular system 100, a number of forward-link CDMA channels can share the same time-frequency space. Similarly, a number of reverse-link channels can share another time-frequency space. To enable this time-frequency sharing, CDMA channels are separately defined by performing an orthogonal conversion and spreading of information to be transmitted on the channel using Walsh codes. Walsh codes can be used to uniquely spread channel information in the same time-frequency space used by other channels using different Walsh codes. At a receiver, the unique Walsh code assigned to a particular channel is used to despread a received signal and to discriminate the desired channel from others occupying the same time-frequency space. The technique is also referred to as "spread spectrum" communication.

To receive and despread CDMA channels that are modulated in a particular radio frequency (RF) band (i.e., a particular frequency space), a mobile station down-converts the carrier frequency of a received RF band and provides the down-converted signal to one or more fingers of a RAKE receiver (also referred to as "finger" receiver). A RAKE receiver contains despreading correlators that can despread a particular channel using the Walsh code associated with that channel. A RAKE receiver may employ multiple fingers to improve multipath signal reception. Different dominant multipath components of a multipath signal can be despread by different RAKE receiver fingers. The RAKE receiver may then combine the despread signals from the different multipath components to maximize the despread energy. The RAKE receiver may combine the despread signals based on an estimate of phase and amplitude of the despread components.

In a second-generation cellular phone system, such as an IS-95 CDMA system, digitized information is transmitted from a base station to multiple mobile stations using a single 1.23 MHz RF band that contains multiple CDMA forward-link channels. Similarly, digitized information from multiple mobile stations are transmitted to a base station over another 1.23 MHz RF band that contains multiple CDMA reverse-link channels.

More recently, third-generation broadband CDMA systems have been proposed in which forward-link spectrum is frequency subdivided into multiple RF bands. Within each of the RF bands, a different set of CDMA channels may be transmitted, where the CDMA channels in one RF band need not use mutually orthogonal coding in relation to another RF band. Third-generation CDMA cellular phone systems can implement an optional operation mode in which a high capacity data channel may be formed between a base station and a mobile station by using multiple CDMA channels, each of which is in a different one of the RF bands. This optional mode may be referred to as multi-carrier (MC) mode.

As shown in FIG. 2, in a multi-carrier CDMA (MC-CDMA) system, data may be transmitted from a base station to a mobile station using a 3.75 MHz of signal spectrum that is subdivided by frequency into different RF bands 211-213. Each of the RF bands 211-213 occupies its own RF spectrum and has a distinct carrier frequency, $f_{c1}$, $f_{c2}$, $f_{c3}$. In proposed MC-CDMA standards, each RF band 211-213 occupies a 1.23 MHz spectrum and adjacent carrier frequencies $f_{c1}$, $f_{c2}$, $f_{c3}$ of the RF bands have a minimum frequency spacing of 1.25 MHz. The carriers $f_{c1}$, $f_{c2}$, $f_{c3}$ may be RF carriers in the cellular band (869-894 MHz) or in PCS band (1930-1990 MHz). Other carrier frequencies may also be used depending on available spectrum.

FIG. 3 shows a block diagram of a single-mode receiver that can be used in a single-mode MC-CDMA mobile station or base station to simultaneously receive and decade CDMA channels in different RF bands. The receiver 300 receives a radio frequency (RF) MC-CDMA signal (an "RF MC-CDMA" signal) from antenna 301 (which may be coupled to receiver 300 through duplexer 302) and provides decoded data to other circuitry in the mobile station or base station on outputs 331-333. For example, outputs 331-333 may be coupled to an audio decompression circuit or a data storage device.

The receiver 300 includes an initial amplification stage 303 to amplify the relatively weak RF MC-CDMA signal received by antenna 301. The amplification stage 303 may include low noise amplifiers (LNAs), band pass filters (BPFs) and radio frequency amplifiers (RFAs) that operate over a broad range of RF frequencies. An intermediate frequency MC-CDMA signal (an "IF MC-CDMA" signal) is then formed by down-converting the amplified RF MC-CDMA signal using a down-converter 304 (also known as a "signal mixer" or "mixer"). The down-converter 304 reduces the carrier frequencies $f_{c1}$, $f_{c2}$, and $f_{c3}$, of received RF bands 211-213 (FIG. 2) by the frequency $f_{LO}$ of a local oscillator 305 signal. As a result, the carrier frequencies $f_{c1}$, $f_{c2}$, and $f_{c3}$ of the RF bands 211-213 are reduced to intermediate frequency (IF) carriers $f_{IF1}$, $f_{IF2}$, and $f_{IF3}$, respectively, where $f_{IF1}=f_{c1}-f_{LO}$, $f_{IF2}=f_{c2}-f_{LO}$, and $f_{IF3}=f_{c3}-f_{LO}$. The resulting IF MC-CDMA signal is then coupled through a band pass filter 306 and a variable gain amplifier 307. The bandwidth of the band pass filter 306 is approximately equal to the bandwidth of the three IF MC-CDMA bands (e.g., approximately 3.7 MHz total).

An I/Q quadrature mixer stage 350 is then used to down-convert the amplified IF MC CDMA signal to produce an amplified and filtered base band signal from the IF MC CDMA signal. The I/Q quadrature mixer stage 350 down-converts the IF MC-CDMA signal to quadrature base band (BB) "I" and "Q" signals using down-converters 308 and 309. Down-converters 308 and 309 reduce the carrier frequencies of the IF MC-CDMA signal by the frequency $f_{LO2}$ of another local oscillator 320. The local oscillator frequency $f_{LO2}$ may be equal to the intermediate carrier frequency, $f_{IF2}$, of the channel 112. Frequency folding occurs due to down-conversion using a local oscillator frequency $F_{LO2}=F_{IF2}$. As a result, each down-converter 308 and 309 will output a base band (BB) MC-CDMA signal having a bandwidth of approximately 1.875 MHz.

Frequency folding at down-converters 308 and 309 can result in the corruption of the information spectrum. Within the I/Q quadrature mixer stage 350, loss of information is prevented by forming and separating I and Q channel information. This can be accomplished by phase-shifting the local oscillator signal used for down-conversion at down-converter 308 by π/2 radians with respect to the oscillator signal used at 309. The resulting base band (BB) I and Q signals are then amplified, filtered, and recombined to reconstruct the data and thus contain the modulated spread CDMA data received in the three RF bands 211-213.

Amplification and filtering of baseband I and Q signals is performed using circuitry 310-313 and 314-317, respectively. Undesired high frequency components in the BB I signal from down-converter 308 are attenuated using a low pass filter 310. To minimize undesired signals, the low pass filter 310 should have a cutoff frequency approximately equal to the bandwidth of the BB I signal (e.g., 1.875 MHz). The filtered BB I signal is then amplified by amplifier 311 and digitally sampled at analog-to-digital converters (ADC) 312. ADC 312 forms a digital representation of the BB I signal. In general, the ADC 312 will sample the BB I signal at a rate of at least twice the BB I signal's highest frequency (resulting, in this example, in a minimum sampling rate of 3.75 MHz). The digital representation of the BB I signal may be filtered again by a digital low pass filter 313 with a 1.875 MHz bandwidth to further remove any residual high frequency interference signals or undesired signals introduced by amplification or analog-to-digital conversion. The BB Q signal may be similarly processed by circuit elements 314-317.

The digitized representations of the BB I and BB Q signals are then summed together using a complex number summing circuit 318. Summing the BB I and BB Q signals results in a full bandwidth (e.g., 3.75 MHz) unfolded signal that contains three base-band signals, each of which corresponds to one of the original three RF bands 211-213. The three base band signals are then separated from each other by a digital filter bank 319 and provided to different RAKE receiver fingers 321-323. The fingers 321-323 can each despread a CDMA channel from its corresponding base band signal to produce digital output 331-333, respectively.

In general, the bandpass filters and low pass filter used in the MC-CDMA receiver architecture 300 are limited to, or optimized for, performance in a single mode (e.g., MC-CDMA). It may, however, be desirable to build a mobile station or other receiving apparatus that can operate in multiple modes. For example, a receiver that can operate in both MC-CDMA mode and IS-95 may be desirable. Referring to FIGS. 3 and 4, to adapt the single-mode receiver 300 for use in multiple modes, filters 306, 310, 313, 314, 317 in receiver 300 may each be replaced with a pair of switched filters (406A, 406B), (410A, 410B), (413A, 413B), (414A, 414B), (417A, 417B), respectively. The first filter in each pair (the "A" filter) may be used to receive a 3.85 MHz MC-CDMA signal and may have a filter value equal to the corresponding filter in receiver 300. The second filter in each pair (the "B" filter) may have a filter value used for filtering a 1.23 MHz IS-95 RF band. For example, filter 406B may be a 1.23 MHz band-pass filter, and filters 410B, 414B, 413B, 417B may each be 0.65 MHz low pass filter. In addition, oscillators 405 and 420 are frequency-selectable to conform to the particular transmission frequencies used in each mode. The use of multiple filter sets to receive different types of CDMA signals may increase the complexity, cost, and/or power use of the receiver 400 or may have other disadvantages. Consequently, alternate receiver designs are desired. As third-generation systems are implemented, initial coverage may be limited. Consequently, a mobile station that can transmit and receive second-generation CDMA signals as well as third-generation CDMA signals is desirable. Multi-mode receivers may require additional filtering, switching, and amplification circuitry that is mode-specific to implement multiple modes. This additional circuitry may add additional size, cost, and complexity to the receiver. Consequently, it is desirable to have a flexible receiver design in which mode-specific circuitry is reduced.

SUMMARY OF THE INVENTION

The present invention provides a method and apparatus for receiving multi-carrier CDMA signals that allows efficient implementation of a CDMA receiver in CDMA systems having multiple modes of operation. The invention utilizes multi-tone down conversion within a CDMA receiver operating in a multi-carrier mode.

Use of multi-tone down conversion in the receiver allows the number of components required to process a multi-carrier (MC) CDMA signal to be reduced and furthers efficient design of CDMA receivers operating in multiple modes, such as an MC-CDMA/CDMA receiver that may include, for example, a TIA/EIA cdma2000 first generation (cdma2000_1x) mode.

In general, in one aspect, the invention features a signal reception method. The method includes receiving a signal, down-converting the received signal to form an intermediate signal through multi-tone down conversion, and decoding the intermediate signal to extract data. The received signal may include multiple transmission bands, each of which occupies a different portion of a spectrum. Each of the transmission bands also includes an information channel signal. When the received signal is down-converted, the intermediate signal is formed. The intermediate signal may include signals from a common intermediate band that includes an information channel from each of a plurality of different transmission bands. When the intermediate signal is decoded, data from the plurality of information channels is extracted.

In general, in another aspect, the invention features a signal reception apparatus. The apparatus includes a down-converter that is configured to form an intermediate signal by down-converting a plurality of transmission bands to a common intermediate band through multi-tone conversion. Each transmission band includes a time period and spectrum portion shared by a group of channels. All of the plurality of groups of channels share the common intermediate band. The apparatus also includes decoding circuitry coupled to the down-converter. The decoding circuitry is configured to extract data from the common intermediate band. The extracted data include each of the plurality of groups of channels.

Implementations may include one or more of the following features. Information channels may each include spread spectrum data. Each channel may use a different spreading code to spread its data. The transmission bands may each be modulated using a different carrier frequency, and the intermediate signal may have a lower carrier frequency than the transmission bands. Down-converting may include using an oscillator signal having multiple frequencies. The multiple frequencies may have the same frequency spacing as a spacing between carrier frequencies in the transmission bands. A base band signal may be formed by down-converting the common spectrum of the intermediate signal to a lower frequency second common spectrum. This second common spectrum may include the plurality of information channel signals. The base band signals may be spectrum folded and have a spectrum narrower than that of the intermediate signal. Multiple base band signals may be sampled and the samples may be combined to form a full spectrum unfolded signal. The method may be implemented in a cellular mobile station or in a base station or in another receiving device. The method may also include amplifying and filtering of the received intermediate and/or base band signals. Each of the transmission bands may also include other information channels that are spread using other spreading codes.

In an embodiment, multi-tone down conversion is utilized to implement an MC-CDMA/CDMA receiver. In CDMA mode, including a cdma2000_1x mode, the receiver receives a 1.23 MHz bandwidth signal at a carrier frequency. In MC-CDMA mode, the receiver receives three separate 1.23 MHz bandwidth signals that occupy a total bandwidth of approximately 3.75 MHz using three separate carrier frequencies. A down-converter is implemented that down-converts the received signal in CDMA mode by a single frequency. In MC-CDMA mode the down-converter down-converts the received signal by three frequencies. The frequencies used in down-converting are chosen so that the intermediate frequency band formed by the down-converting may pass through a bandpass filter having a 1.23 MHz bandwidth. In CDMA mode the signal passed through the bandpass filter is the received 1.23 MHz bandwidth signals. In MC-CDMA mode the intermediate signal passed through the bandpass filter is a composite of the three separate 1.23 MHz bandwidth signal. The intermediate signal is then processed through a baseband conversion stage. The output of the baseband stage is then simultaneously processed in a set of RAKE receiver fingers. In MC-CDMA mode each of the three received signals may be selected and despread using a Walsh code unique to each of the three received signals. In CDMA mode the RAKE fingers may be used to decode different dominant multipath components. Additionally, added RAKE fingers may be used to enable multipath decoding in MC-CDMA mode.

Implementations may include one or more of the following advantages. A receiver can operate to receive multiple signal types, such as IS-95, 3G_3x, and 3G_1x signals. A common set of intermediate frequency (IF) band pass filters (BPFs) and base-band (BB) low pass filters (LPFs) may be used for operation in different modes. This may reduce cost and part size compared with devices using different sets of intermediate filters and base band filters for different modes of operation.

BRIEF DESCRIPTION OF DRAWINGS

The details of one or more embodiments of the invention are set forth in the accompanying drawings and the description below. Other features, objects, and advantages of the invention will be apparent from the description and drawings, and from the claims.

FIG. 8 is a circuit diagram of oscillator 505 of the receiver of FIG. 5; and

DETAILED DESCRIPTION OF THE INVENTION

Figure 1:
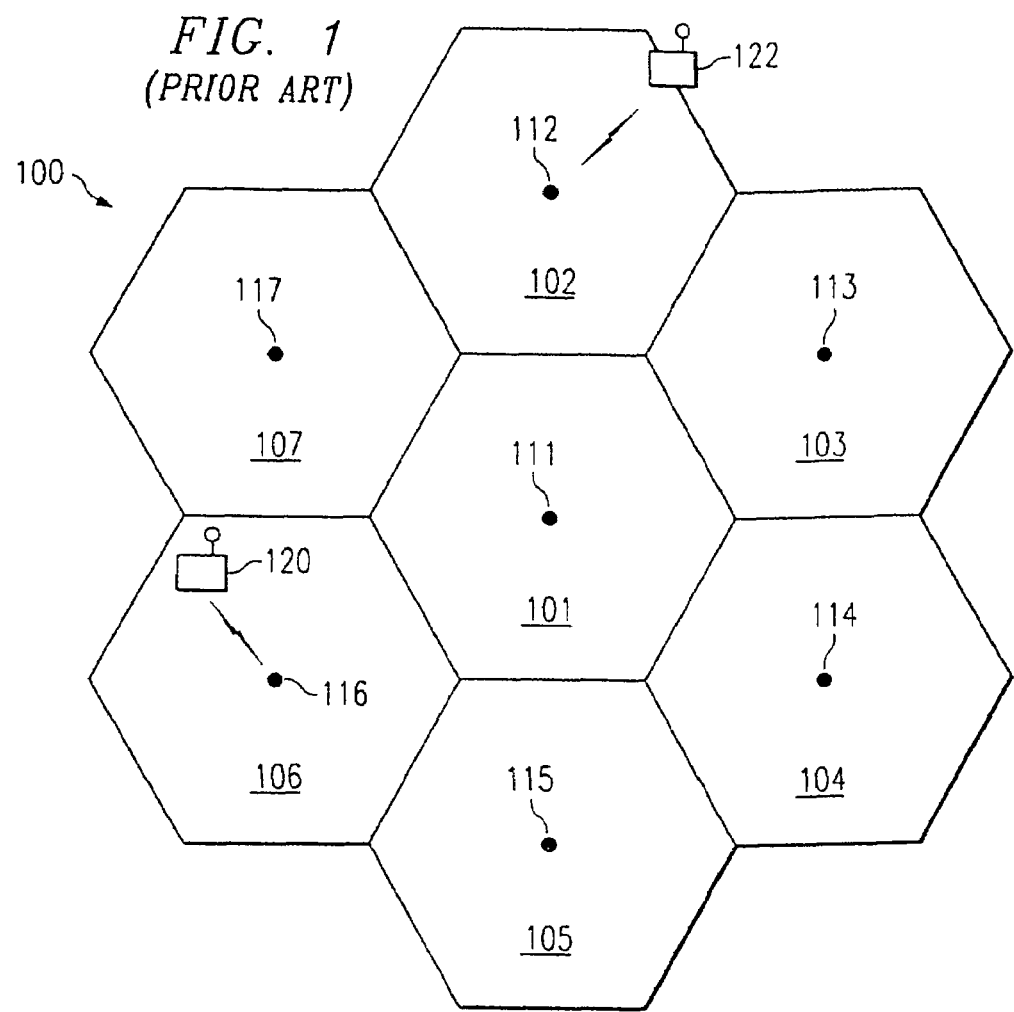
FIG. 1 is a diagram of a conventional cellular radio communication system.
Figure 2:
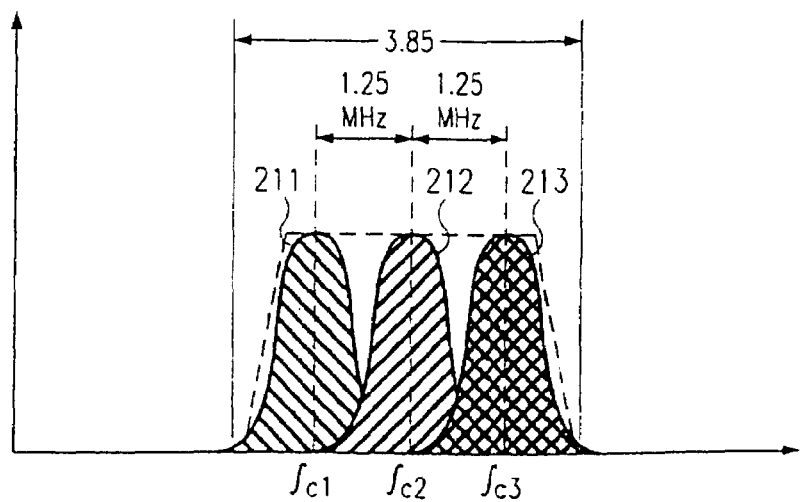
FIG. 2 shows different RF bands of a conventional cellular system.
Figure 5:
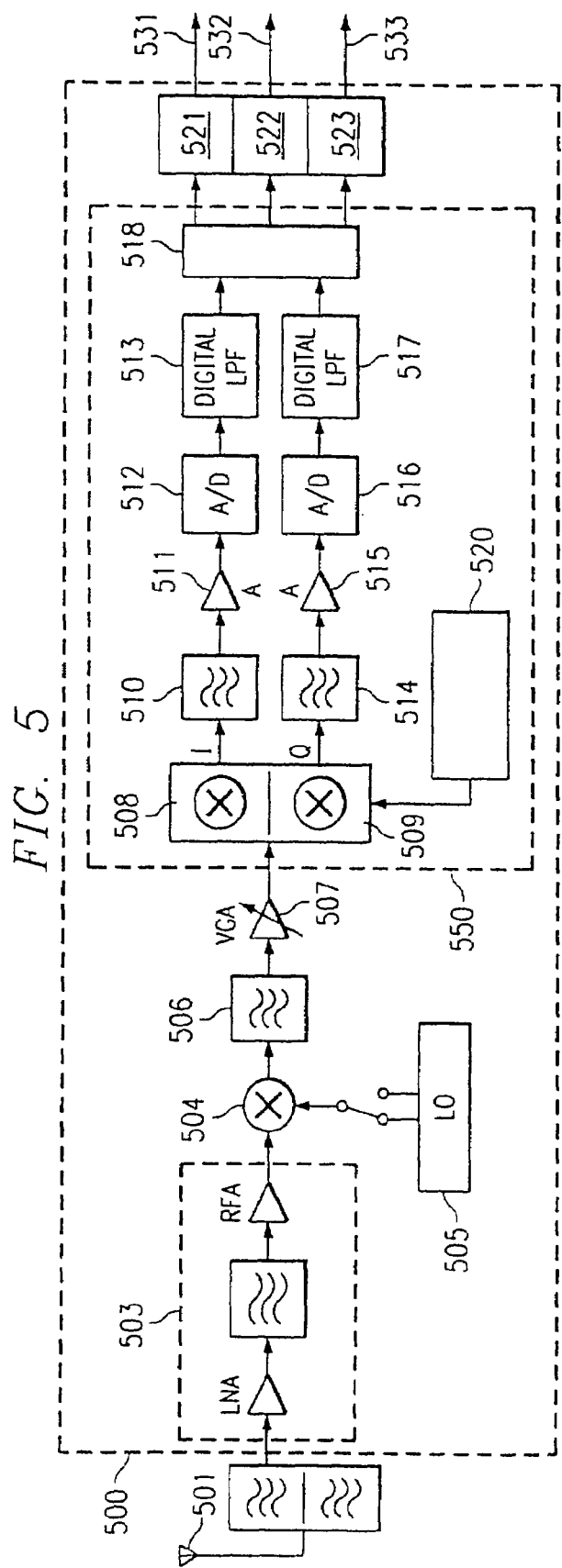
FIG. 5 is a block diagram of a multimode receiver design according to an embodiment of the invention.

FIG. 5 is a block diagram of multimode receiver 500 according to an embodiment of the invention. Receiver 500 may support multiple operational modes (for example, MC-CDMA and IS-95 modes). Receiver 500 supports multimode operation using a unique down-conversion mechanism that allows a wide bandwidth signal to be filtered, amplified and/or otherwise processed using common circuitry compatible with both a wide and a narrower bandwidth signal. More particularly, the receiver 500 has a single carrier mode in which the receiver 500 receives and despreads a CDMA channel transmitted in a single RF band (such as an IS-95 signal), and a multi-carrier mode in which the receiver 500 simultaneously receives and despreads multiple CDMA channels from different RF bands (e.g., bands 211-213 of FIG. 2).

An exemplary IS-95/MC-CDMA implementation is described to further explain the operation of the receiver 500. In the description that follows, IS-95 mode refers to a single-carrier mode in which a single IS-95 RF band having a 1.23 MHz bandwidth signal is received, and MC-CDMA mode refers to a multi-carrier mode in which three separate CDMA channels in three separate RF bands 211-213 of an MC-CDMA signal are received. The three bands 211-213 occupy a total bandwidth of approximately 3.75 MHz (1.23 MHz per band).

Figure 3:
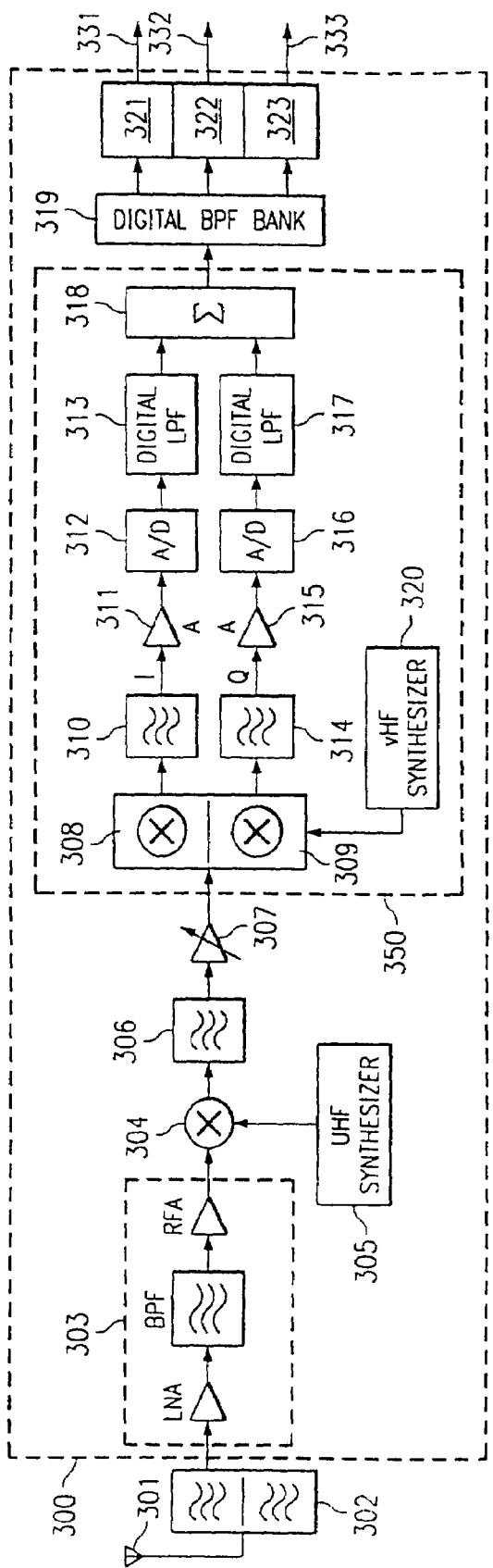
FIG. 3 is a block diagram of a prior art single-mode receiver design.
Figure 4:
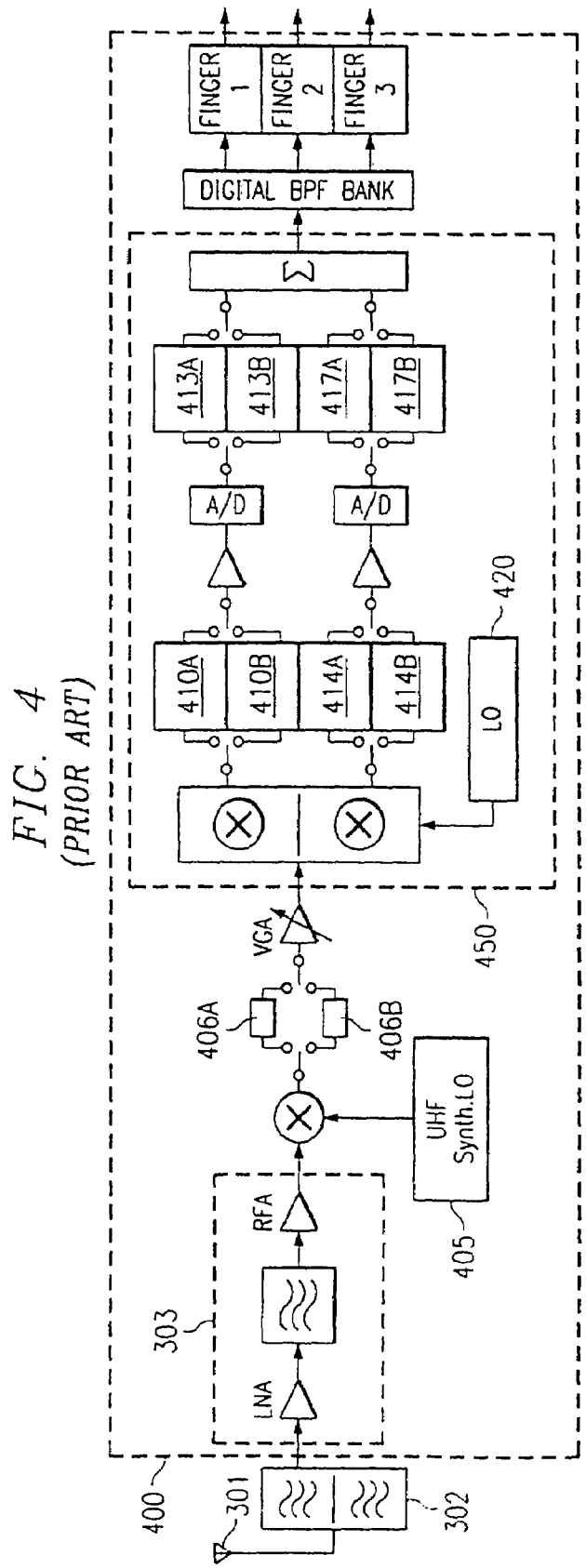
FIG. 4 is a block diagram of a prior art multimode receiver design.

In both IS-95 and MC-CDMA modes, a relatively weak radio frequency (RF) signal from antenna 501 is amplified using an initial amplification stage 503. Amplification stage 503 operates similar to amplification stage 303 (FIG. 3). Filters and amplifiers in the amplification stage 503 are compatible with the RF spectrum and bandwidth of both the IS-95 and MC-CDMA RF signals. Thus, for example, the pass-band of filters in the amplification stage 503 includes the spectrum occupied by the IS-95 RF band and by the MC-CDMA RF bands. The amplified IS-95 or MC-CDMA RF signal is then coupled to a down-converter 504.

Down-converter 504 reduces the carrier frequencies of RF bands by the frequencies produced by local oscillator 505. In IS-95 mode, local oscillator 505 operates in a single-tone mode wherein a single-frequency, $f_{LO}$, is output. When the local oscillator signal $f_{LO}$ is mixed with the amplified IS-95 RF band from amplifier stage 503, the carrier frequency of the IS-95 RF band is reduced by the frequency $f_{LO}$, thus forming an intermediate frequency (IF) IS-95 band having a 1.23 MHz bandwidth. In MC-CDMA mode, local oscillator 505 operates in a multi-tone mode, wherein a signal $f_{LO-M}$ having multiple frequency components is output.

Figure 6:
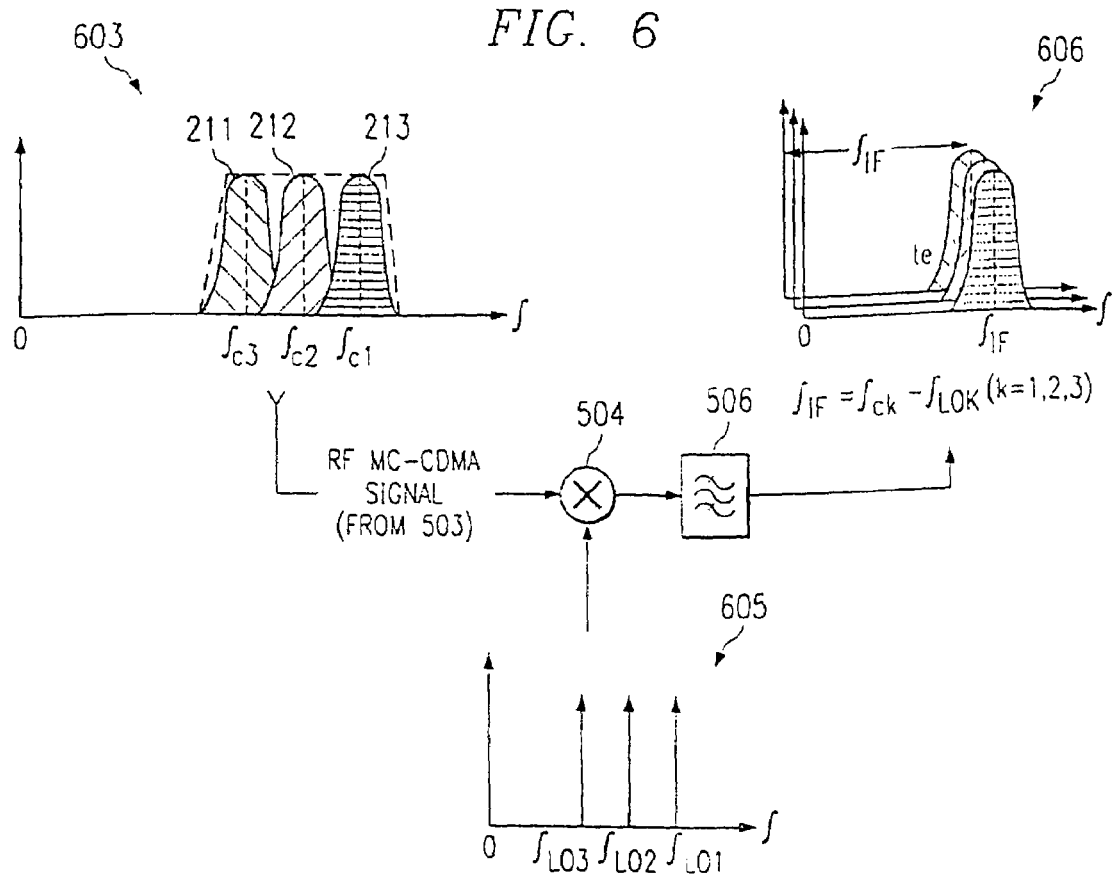
FIG. 6 illustrates signal inputs and outputs within the receiver of FIG. 5.

Referring to FIG. 6, therein are illustrated signal inputs and outputs within the receiver 500 in MC-CDMA mode. Local oscillator 505 outputs a local oscillator signal $f_{LO-M}$, 605, having three frequency components $f_{LO3}$, $f_{LO2}$, $f_{LO1}$. In general, the frequencies $f_{LO3}$, $f_{LO2}$, $f_{LO1}$ will have the same spacing as carrier frequencies in the MC-CDMA RF bands 603 received from amplification stage 503. Thus, if the carrier frequencies $f_{c3}$, $f_{c2}$, $f_{c1}$ of the MC-CDMA RF signal 603 have a spacing of 1.25 MHz, the frequencies $f_{LO3}$, $f_{LO2}$, $f_{LO1}$, of the local oscillator signal 605 will, likewise, have a 1.25 MHz spacing.

Figure 7:
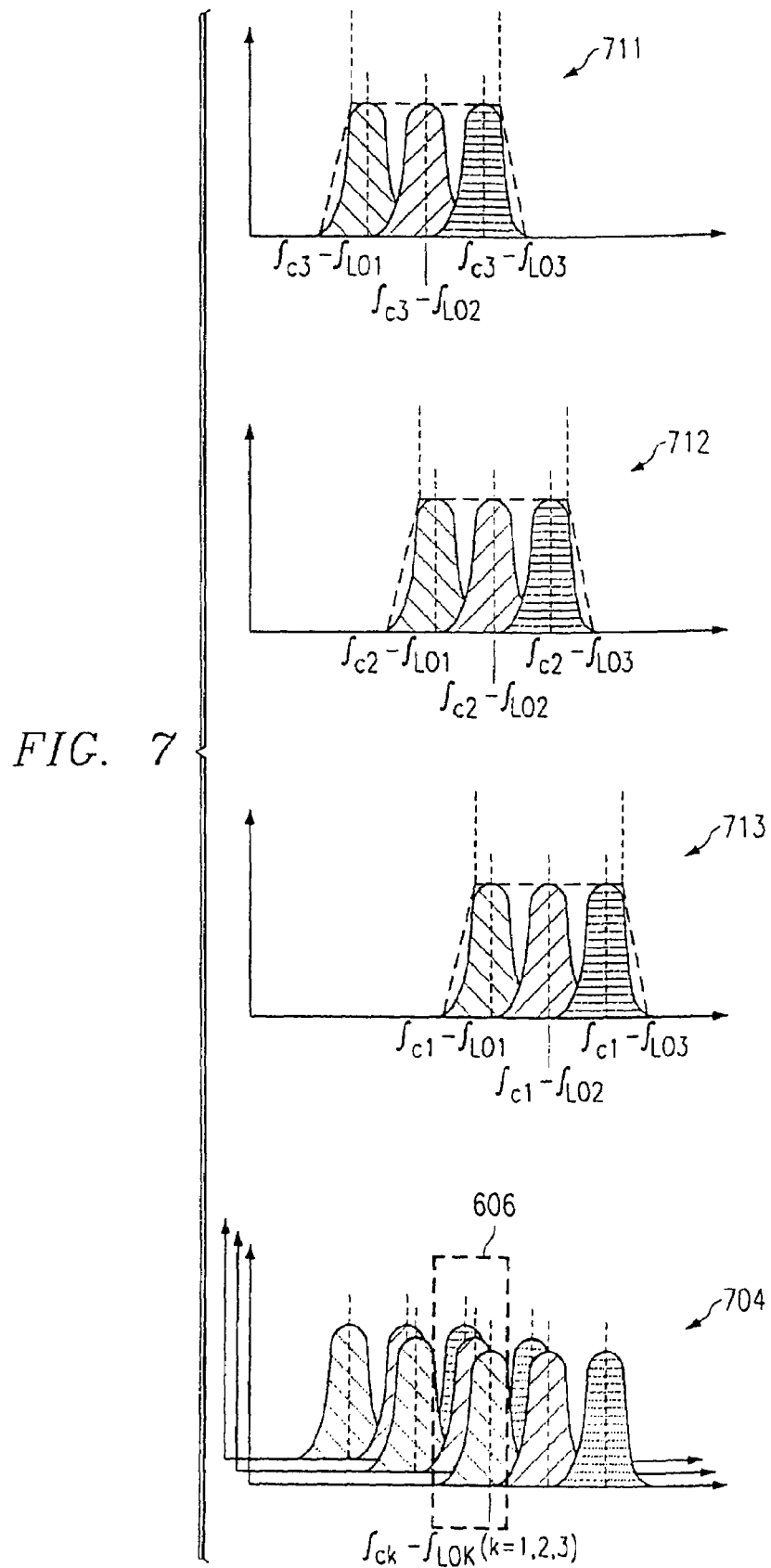
FIG. 7 is a diagram illustrating signals in the receiver of FIG. 5.

When a three band RF MC-CDMA signal 603 is down-converted at down-converter 504 using multi-tone local oscillator signal 605, the signal output by down-converter 504 will be a composite of the signal 603 carrier reduced by each of the frequencies $f_{LO3}$, $f_{LO2}$, $f_{LO1}$. That is, each of the bands 211-213 will appear in the down-converter output three times—the first time with its carrier frequency reduced by $f_{LO1}$, the second time with its carrier frequency reduced by $f_{LO2}$, and the third time with its carrier frequency reduced by $f_{LO3}$. This is illustrated in FIG. 7. In FIG. 7, the signal components resulting from down-converting bands 211, 212, and 213 using $F_{LO-M}$ are shown, respectively, as 711, 712, and 713. The actual output of the down-converter is a composite of the signals 711-713. The composite signal output by the down converter 504 is shown as 704. As shown in 704, the three signals 711-713 each have one band in common [that is, the band with a carrier frequency $f_{ck}-f_{LOk}$ (for k=1, 2,3)].

The composite signal 704 output by down-converter 504 is then filtered by a band pass filter 506 having a pass band of 1.23 MHz centered at the common carrier frequency $f_{ck}-f_{LOk}$ of the signal components 711-713. The output of filter 506, shown as 606, will have a 1.23 MHz bandwidth and will be a composite of each of the original RF bands 211-213 carrier reduced to the intermediate carrier frequency $f_{ck}-f_{LOk}$. In the receiver 500, the single-tone local oscillator signal $f_{LO}$, and the multitone local oscillator signals $f_{LO3}$, $f_{LO2}$, $f_{LO1}$ will, in general, be selected such that the intermediate frequency signal produced in single-carrier mode and the common carrier frequency $f_{ck}-f_{LOk}$ produced in multi-carrier mode are the same. This allows both the intermediate frequency band formed by the down-converter in single-carrier mode, and the composite band formed by the down-converter in multi-carrier mode to pass through the band pass filter 506.

In both single-carrier and multi-carrier modes, the intermediate signal output by the down-converter 504 is then converted to base band signals, amplified, filtered, and digitally sampled. As in the receiver 300, the intermediate signal is converted to BB I and Q signals using a pair of down-converters 508 and 509 in an I/Q quadrature mixer stage 550. As with down-converters 308 and 309 (FIG. 3), the down-converters 508 and 509 mix the intermediate signal with a local oscillator signal to produce a spectrum-folded output signal. In the present example, the intermediate frequency IS-95 signal or composite (606) MC-CDMA signal is folded to a bandwidth of approximately 0.615 MHz. Additionally, as with down-converters 308 and 309, the local oscillator signal used for down-conversion at down-converter 508 is phase shifted by π/2 radians with respect to the local oscillator signal used at down-converter 509. Circuitry 510-518 also operates similarly to circuit elements 310-318, respectively. Note that the pass band of filters 510, 513, 514, 517 will, in general, be lower than the pass band of the corresponding filters 310, 313, 314, 317 in receiver 300 due to the correspondingly lower intermediate signal input to stage 550. For example, in an IS-95/MC-CDMA implementation, the filters 510, 513, 514, 517 will each have a 0.615 MHz pass band.

Digital representations of the BB I and Q signals produced by analog-to-digital converters 512 and 516 and filtered by digital filters 513 and 517 are then summed in a complex number summing circuit 518 to produce a full bandwidth unfolded signal. The unfolded signal is then provided to each receiver finger 521-523 of the RAKE receiver. In multi-carrier mode, the receiver fingers 521-523, may be configured to use different Walsh codes to select and despread different CDMA channels (e.g., CDMA channels that originated in different RF bands 211-213). Thus, using the orthogonal properties of Walsh codes, the receiver fingers can separate different channels from the composite signal 606. Note that, in some implementations, the same Walsh codes may be used in different bands 211-213; however, the Walsh codes in different bands will have different encoding phases. In IS-95 mode, the receiver fingers 521-523 may be configured to use the same Walsh code to decode a single CDMA channel but may be used to decode different dominant multipath components. An implementation may include additional receiver fingers of the RAKE receiver to enable multipath decoding in multi-carrier mode.

FIG. 8 shows additional details of the local oscillator 504 that may be used to produce both a single-frequency local oscillator signal $f_{LO}$ and a multi-frequency local oscillator signal $f_{LO-M}$. The oscillator 505 may include a dual frequency synthesizer chip 801, a UHF voltage control oscillator (VCO) 802, a 1.25 MHz frequency oscillator 803, a UHF mixer 804, buffers 805-808, and a signal combiner 809. The 1.25 MHz oscillator, mixer, buffers, and combiner can be integrated in a monolithic integrated circuit (IC) with the synthesizer chip, or a receiver RF or IF chip. The three-tone synthesizer has two operation modes. One generates three UHF tones and another one performs as a conventional synthesizer providing only single tone. The frequency interval between two adjacent tones is 1.25 MHz, and output power level of each tone is around 0~5 dBm.

Although a multi-carrier mode using three RF bands was described, implementations may use a greater or fewer number of RF bands in multi-carrier mode and local oscillator 505 producing a greater or fewer number of frequencies. Additionally, an implementation may down-convert the multiple RF bands such that only a subset of RF bands overlap. For example, the number of RF bands in a multi-carrier system may be expanded to six and the local oscillator 505 may be configured to produce an oscillator signal containing two corresponding frequencies.

Figure 9:
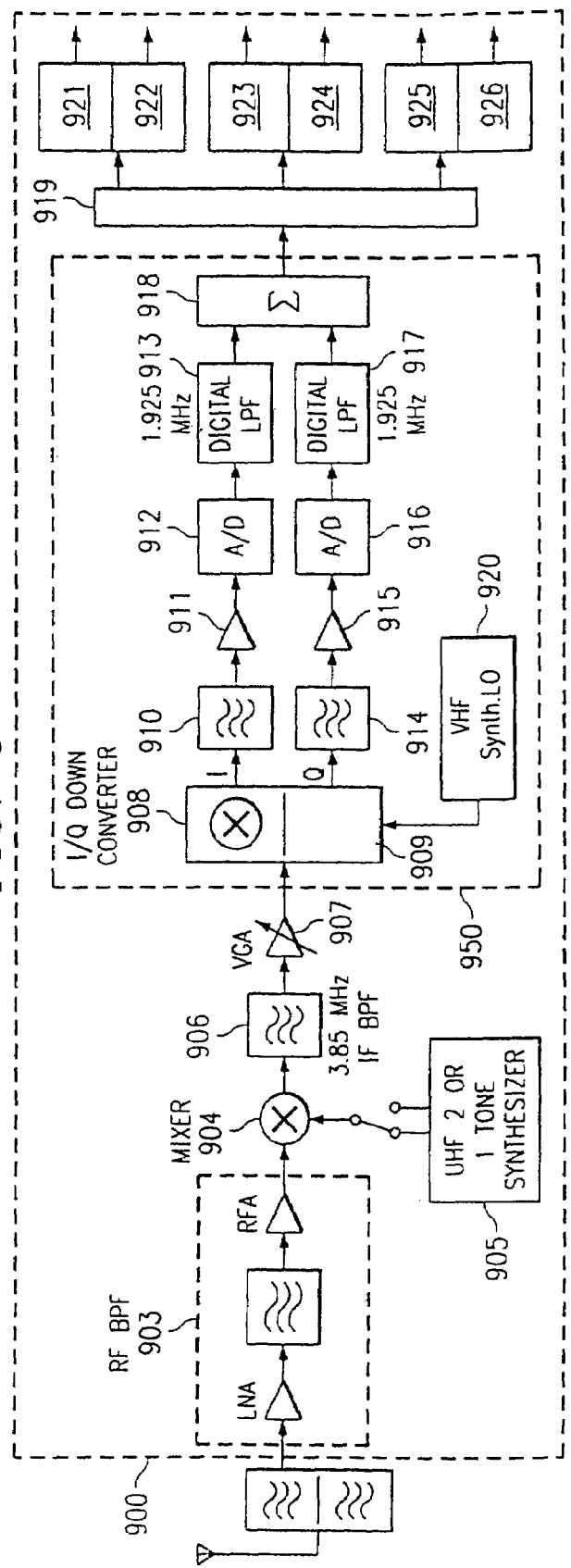
FIG. 9 is a block diagram of a multimode receiver designed according to another embodiment of the invention.

Referring to FIG. 9, an exemplary six-band receiver 900 is shown. The receiver 900 receives an RF signal that includes six RF bands. Each of the RF bands may occupy a 1.23 MHz bandwidth and the carrier frequencies of the six bands may be spaced 1.25 MHz apart. In addition, the desired CDMA signals in the first three adjacent RF bands may all use the same Walsh code (code A), while the desired CDMA signals in the second three adjacent RF bands may all use another Walsh code (code B).

Receiver 900 down-converts the six bands in the received RF signal to a three-band intermediate signal by mixing the six-band signal with a local oscillator signal containing two frequencies in mixer 904. The two local oscillator frequencies may be spaced three carrier frequencies (3.70 MHz) apart. Thus, the three bands in the resulting intermediate frequency signal will be formed by overlapping the first three adjacent RF bands with the second three adjacent bands. Thus, each of the intermediate bands will contain a desired CDMA channel using Walsh code "A" and another desired channel using Walsh code "B". The three bands in the intermediate signal may then be processed using circuit elements 906-920. Circuitry 906-920 may be substantially identical to circuitry 306-320 (FIG. 3). Thus, each of the three outputs from the digital filter 919 will consist of a different one of the three intermediate frequency bands. These three separated bands, each containing a Walsh code "A" CDMA signal and a Walsh code "B" CDMA signal, are provided to a different pair of receiver fingers 921-926. Each pair of receiver fingers consists of a receiver (921, 923, 925) configured to decode Walsh code A, and another receiver finger (922, 924, 926) configured to decode Walsh code B.

A number of embodiments of the present invention have been described. Nevertheless, it will be understood that various modifications may be made without departing from the spirit and scope of the invention. For example, a different number of initial and intermediate amplification and filtering stages may be used. Accordingly, other embodiments are within the scope of the following claims.

What is claimed is:

1. A method comprising:
   receiving an RF signal, said received RF signal comprising a plurality of information channel signals each comprising different code division multiple access data spread using a different spreading code, wherein each of said plurality of information channel signals are transmitted in one of a plurality of transmission bands, and each of said plurality of information channel signals is carried on one of a plurality of carrier frequencies;
   down-converting said received RF signal by a single down-converter to form an intermediate signal, wherein said single down-converter is arranged to receive said received RF signal and simultaneously multiply said RF signal by a plurality of oscillator signals when operating in a first mode and multiply said RF signal by a single oscillator signal when operating in a second mode, wherein said intermediate signal comprises down-converted versions formed by the single down-converter of each of said plurality of information channel signals, and said down-converted versions of each of said plurality of information channel signals are generated from a plurality of frequencies, said down-converted versions of each of said plurality of information channel signals are within a common frequency spectrum;
   processing the intermediate signal in a baseband stage to generate a baseband signal; and
   decoding said baseband signal to extract data from said down-converted versions of each of said plurality of information channel signals.

2. The method of claim 1, wherein a frequency spacing between each adjacent pair of said plurality of carrier frequencies and between each adjacent pair of said plurality of oscillator signals is substantially the same.

3. The method of claim 1, wherein said common frequency spectrum comprises a first common frequency spectrum, and the step of forming the baseband signal comprises down-converting said first common frequency spectrum to a second common frequency spectrum, said second common frequency spectrum being lower in frequency than said first common frequency spectrum.

4. The method of claim 3, wherein the step of forming said baseband signal further comprises down-converting the intermediate signal using a first oscillator signal to form a first baseband component signal and a second oscillator signal to form a second baseband component signal, the first and second oscillator signals each at a same frequency and a different phase.

5. The method of claim 4, wherein said first baseband component comprises a first folded signal and said second baseband component comprises a second folded signal, each folded signal having a frequency spectrum narrower than said first common frequency spectrum.

6. The method of claim 5 further comprising the steps of:
   sampling said first baseband component to form a first digital representation;
   sampling said second baseband component to form a second digital representation; and
   combining said first and said second digital representations to form an unfolded signal, said unfolded signal having a frequency spectrum greater than the spectrum of the first folded signal.

7. The method of claim 1, wherein the step of receiving an RF signal comprises receiving an RF signal from a cellular radio base station.

8. The method of claim 1, further comprising the step of filtering said RF signal to attenuate at least one signal outside the common frequency spectrum before performing said step of down-converting.

9. A mobile radio telephone unit comprising:
   an antenna configured to receive an RF signal, said received RF signal comprising a plurality of information channel signals, each comprising different code division multiple access data spread using a different spreading code, wherein each of said plurality of information channel signals is transmitted in one of a plurality of transmission bands, and each of said plurality of information channel signals is carried on one of a plurality of carrier frequencies;
   a single down-converter operatively coupled to the antenna and configured to down-convert said RF signal to form an intermediate signal, wherein said single down-converter is arranged to receive said received RF signal and simultaneously multiply said RF signal by a plurality of oscillator signals when operating in a first mode and multiply said RF signal by a single oscillator signal when operating in a second mode, wherein said intermediate signal comprises down-converted versions of each of said plurality of information channel signals, and said down-converted versions of each of said plurality of information channel signals are generated from a plurality of frequencies, said down-converted versions of each of said plurality of information channel signals are within a common frequency spectrum;
   a baseband stage, coupled to said single down-converter, said baseband stage for processing said intermediate signal to generate a baseband signal; and
   a decoder operatively coupled to the single down-converter and configured to decode said baseband signal to extract data from said down-converted versions of each of said plurality of information channel signals.

10. The mobile radio telephone unit of claim 9, wherein said single down-converter is configured to down-convert each of said plurality of carrier frequencies by a plurality of oscillator signals having a lower frequency.

11. The mobile radio telephone unit of claim 9, wherein said single down-converter comprises an oscillator for generating the plurality of oscillator signals and the single oscillator signal, a frequency spacing between each adjacent pair of said plurality of carrier frequencies and between each adjacent pair of said plurality of oscillator signals being substantially the same.

12. A CDMA receiver for operating in at least a first mode and a second mode, said CDMA receiver comprising:
  an initial RF stage, said initial RF stage for outputting a received RF signal, said received RF signal comprising a plurality of information channel signals each comprising different code division multiple access data spread using a different spreading code, wherein each of said plurality of information channel signals are transmitted in one of a plurality of transmission bands, and each of said plurality of information channel signals is carried on one of a plurality of carrier frequencies;
  an oscillator, said oscillator for generating a plurality of oscillator signals, each at a different frequency, when the receiver operates in the first mode and generating a single oscillator signal when the receiver operates in the second mode;
  a single down-converter coupled to said initial RF stage and said oscillator, said single down-converter for receiving said received RF signal and simultaneously multiplying said received RF signal by said plurality of oscillator signals when the receiver operates in the first mode, and multiplying said received RF signal by said single oscillator signal when the receiver operates in the second mode, to generate an intermediate signal, wherein said intermediate signal comprises down-converted versions of each of said plurality of information channel signals, and said down-converted versions of each of said plurality of information channel signals are generated from a plurality of frequencies, said down-converted versions of each of said plurality of information channel signals are within a common frequency spectrum;
  a baseband stage, coupled to said single down-converter, said baseband stage for processing said intermediate signal to generate a baseband signal.

13. A base station unit comprising:
  a receiver to receive an RF signal, said RF signal comprising a plurality of information channel signals, each comprising different code division multiple access data spread using a different spreading code, wherein each of said plurality of information channel signals is transmitted in one of a plurality of transmission bands, and each of said plurality of information channel signals is carried on one of a plurality of carrier frequencies;
  a single down-converter operatively coupled to said receiver and configured to down-convert said RF signal to form an intermediate signal, wherein said single down-converter is arranged to receive said received RF signal and simultaneously multiply said RF signal by a plurality of oscillator signals when operating in a first mode and multiply said RF signal by a single oscillator signal when operating in a second mode, wherein said intermediate signal comprises down-converted versions of each of said plurality of information channel signals, and said down-converted versions of each of said plurality of information channel signals are generated from a plurality of frequencies, said down-converted versions of each of said plurality of information channel signals are within a common frequency spectrum.

14. The base station unit of claim 13, wherein said single down-converter comprises an oscillator for generating an oscillator signal comprising a plurality of oscillator frequencies, a frequency spacing between each adjacent pair of said plurality of carrier frequencies and between each adjacent pair of said plurality of oscillator signals being substantially the same.

15. A chip apparatus comprising:
  a receiver to receive an RF signal, said RF signal comprising a plurality of information channel signals, each comprising different code division multiple access data spread using a different spreading code, wherein each of said plurality of information channel signals is transmitted in one of a plurality of transmission bands, and each of said plurality of information channel signals is carried on one of a plurality of carrier frequencies; and
  a single down-converter operatively coupled to said receiver and configured to down-convert said RF signal to form an intermediate signal, wherein said single down-converter is arranged to receive said received RF signal and simultaneously multiply said RF signal by a plurality of oscillator signals when operating in a first mode and multiply said RF signal by a single oscillator signal when operating in a second mode, wherein said intermediate signal comprises down-converted versions of each of said plurality of information channel signals, and said down-converted versions of each of said plurality of information channel signals are generated from a plurality of frequencies, said down-converted versions of each of said plurality of information channel signals are within a common frequency spectrum.

16. The chip apparatus of claim 15, wherein said single down-converter comprises an oscillator for generating an oscillator signal comprising a plurality of oscillator frequencies, a frequency spacing between each adjacent pair of said plurality of carrier frequencies and between each adjacent pair of said plurality of oscillator signals being substantially the same.

17. An apparatus comprising:
  means for receiving an RF signal, said RF signal comprising a plurality of information channel signals each comprising different code division multiple access data spread using a different spreading code, wherein each of said plurality of information channel signals are transmitted in one of a plurality of transmission bands, and each of said plurality of information channel signals is carried on one of a plurality of carrier frequencies; and
  single means for down-converting said RF signal to form an intermediate signal, wherein said single means for down-converting is arranged to receive said received RF signal and simultaneously multiply said RF signal by a plurality of oscillator signals when operating in a first mode and multiply said RF signal by a single oscillator signal when operating in a second mode, wherein said intermediate signal comprises down-converted versions of each of said plurality of information channel signals, and said down-converted versions of each of said plurality of information channel signals are generated from a plurality of frequencies, said down-converted versions of each of said plurality of information channel signals are within a common frequency spectrum.

18. The apparatus of claim 17, wherein said single means for down-converting comprises an oscillator for generating an oscillator signal comprising a plurality of oscillator frequencies, a frequency spacing between each adjacent pair of said plurality of carrier frequencies and between each adjacent pair of said plurality of oscillator signals being substantially the same.

19. The mobile radio telephone unit of claim 9, wherein each down-converted version is processed by circuitry that processes all other down-converted versions from the down-converter to the decoder.

20. The method of claim 1, further comprising amplifying, filtering, and amplifying the received RF signal before down converting it.

21. The mobile radio telephone unit of claim 9, further comprising a first filter, a first amplifier, a second filter, and a second amplifier, wherein the received RF signal is successively filtered, amplified, filtered, and amplified before being down converted by the single down converter.

22. The mobile radio telephone unit of claim 21, further comprising a down converter that converts the intermediate signal to in phase (I) and quadrature (Q) component signals.

23. The mobile radio telephone unit of claim 9, further comprising an amplifier amplifying the received RF signal before it is down converted by the single down converter.

24. The mobile radio telephone unit of claim 9, further comprising the oscillator for generating the plurality of oscillator signals.

25. The mobile radio telephone unit of claim 24, wherein the oscillator comprises a synthesizer.

26. The mobile radio telephone unit of claim 9, wherein each one of the received RF signal follows a single path to the down-converter.

27. The method of claim 1, wherein the intermediate frequency accommodates multiple intermediate frequency bands.

28. The mobile radio telephone unit of claim 24, wherein the oscillator comprises a mixer.

29. The chip apparatus of claim 15, wherein the chip apparatus is comprised of at least one integrated circuit.

30. The chip apparatus of claim 15, wherein the chip apparatus is comprised of a single integrated circuit chip.

31. The chip apparatus of claim 30, further comprising a down converter that converts the down-converted received RF signal to in phase (I) and quadrature (Q) component signals.

32. The chip apparatus of claim 31, further comprising a first filter, a first amplifier, a second filter, and a second amplifier, wherein the received RF signal is successively filtered, amplified, filtered, and amplified in a single signal path before being down converted by the single down converter.

33. The chip apparatus of claim 15, further comprising a baseband stage, coupled to said single down-converter, said baseband stage for processing said intermediate signal to generate a baseband signal.

34. The chip apparatus of claim 33, further comprising a decoder operatively coupled to the baseband stage and configured to decode the baseband signal, the decoder comprising a first set of RAKE fingers for decoding in the first mode and a second set of RAKE fingers for decoding in the second mode.

35. The method of claim 1, wherein decoding comprises using a first set of RAKE fingers in the first mode and using a second set of RAKE fingers in the second mode.

36. The mobile radio telephone unit of claim 9, wherein the decoder comprises a first set of RAKE fingers for decoding in the first mode and a second set of RAKE fingers for decoding in the second mode.

37. The CDMA receiver of claim 12, further comprising a decoding stage comprising a first set of RAKE fingers for decoding the processed intermediate signal in the first mode and a second set of RAKE fingers for decoding the processed intermediate signal in the second mode.

38. The base station unit of claim 13, further comprising a baseband stage, coupled to said single down-converter, said baseband stage for processing said intermediate signal; and a decoder operatively coupled to the baseband stage and configured to decode said intermediate signal to extract data from said down-converted versions of each of said plurality of information channel signals, the decoder comprising a first set of RAKE fingers for decoding in the first mode and a second set of RAKE fingers for decoding in the second mode.

39. The apparatus of claim 17, further comprising means for baseband processing said intermediate signal; and means for decoding operatively coupled to the means for baseband processing to generate a baseband signal, the means for decoding configured to decode said baseband signal to extract data from said down-converted versions of each of said plurality of information channel signals, the means for decoding comprising a first set of RAKE fingers for decoding in the first mode and a second set of RAKE fingers for decoding in the second mode.

40. The method of claim 1, wherein said down-converted versions of each of said plurality of information channel signals have a band in common with a carrier frequency $f_{cj}-f_{LOj}$, for j=1 to n, where n represents the number of information channel signals frequency, $f_{cj}$ represents the carrier frequency for the $j^{th}$ information channel signal, and $f_{LOj}$ represents the local oscillator frequency for the $j^{th}$ information channel.

* * * * *